US 8,110,955 B2

(12) United States Patent
Ries

(10) Patent No.: US 8,110,955 B2
(45) Date of Patent: Feb. 7, 2012

(54) MAGNETIC BEARING DEVICE OF A ROTOR SHAFT AGAINST A STATOR WITH ROTOR DISC ELEMENTS, WHICH ENGAGE INSIDE ONE ANOTHER, AND STATOR DISC ELEMENTS

(75) Inventor: Günter Ries, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 1060 days.

(21) Appl. No.: 11/922,316

(22) PCT Filed: Jun. 12, 2006

(86) PCT No.: PCT/EP2006/063083
§ 371 (c)(1),
(2), (4) Date: Dec. 17, 2007

(87) PCT Pub. No.: WO2006/134084
PCT Pub. Date: Dec. 21, 2006

(65) Prior Publication Data
US 2011/0140559 A1   Jun. 16, 2011

(30) Foreign Application Priority Data
Jun. 17, 2005   (DE) .......................... 10 2005 028 209

(51) Int. Cl.
H02K 7/09   (2006.01)
H02K 1/00   (2006.01)
(52) U.S. Cl. .................. 310/90.5; 310/156.64; 310/268
(58) Field of Classification Search .................. 310/90.5, 310/156.08, 156.53, 156.56, 156.64, 268
See application file for complete search history.

(56) References Cited

U.S. PATENT DOCUMENTS

| | | | |
|---|---|---|---|
| 3,891,953 A * | 6/1975 | Thomin | 335/289 |
| 4,268,095 A * | 5/1981 | Millner | 310/90.5 |
| 4,370,004 A | 1/1983 | Morikawa et al. | |
| 4,620,752 A | 11/1986 | Fremerey et al. | |
| 5,315,197 A * | 5/1994 | Meeks et al. | 310/90.5 |
| 5,521,448 A * | 5/1996 | Tecza et al. | 310/90.5 |
| 6,570,286 B1 * | 5/2003 | Gabrys | 310/90.5 |
| 6,581,476 B1 | 6/2003 | Fremerey | |
| 6,770,995 B1 * | 8/2004 | Foshage | 310/90.5 |

FOREIGN PATENT DOCUMENTS

DE   34 09 047   9/1985
DE   38 44 563   10/1991
(Continued)

OTHER PUBLICATIONS

Search Report issued in corresponding International Patent Application No. PCT/EP2006/063083, mailed on Dec. 5, 2006.
Office Action issued in corresponding German Patent Application No. 102005028209.1, on Mar. 16, 2005.

*Primary Examiner* — Tran Nguyen
(74) *Attorney, Agent, or Firm* — Staas & Halsey LLP

(57) ABSTRACT

The magnetic bearing device contains soft-magnetic rotor disc elements, which radially engage inside one another, and soft-magnetic stator disc elements. These elements are, on their sides facing one another, provided with annular tooth-like projections that are opposite one another on either side of an air gap. In addition, magnetic field generators for generating a magnetic flux oriented in an axial direction between the disc elements are assigned to the rotor disc elements or to the stator disc elements.

22 Claims, 6 Drawing Sheets

FOREIGN PATENT DOCUMENTS

| | | |
|---|---|---|
| DE | 42 34 524 | 4/1993 |
| DE | 44 36 831 | 9/1997 |
| DE | 199 44 863 | 4/2001 |
| EP | 0 413 851 | 2/1991 |
| JP | 9-133133 | 5/1997 |
| JP | 09133133 A * | 5/1997 |

* cited by examiner

MAGNETIC BEARING DEVICE OF A ROTOR SHAFT AGAINST A STATOR WITH ROTOR DISC ELEMENTS, WHICH ENGAGE INSIDE ONE ANOTHER, AND STATOR DISC ELEMENTS

CROSS REFERENCE TO RELATED APPLICATIONS

This application is based on and hereby claims priority to PCT Application No. PCT/EP2006/063083 filed on Jun. 12, 2006 and German Application No. 10 2005 028 209.1 filed on Jun. 17, 2005, the contents of which are hereby incorporated by reference.

BACKGROUND OF THE INVENTION

A device for magnetic bearing of a rotor shaft with respect to a stator has the following features:
a) a first bearing part is connected to the rotor shaft and is surrounded by a second bearing part, which is associated with the stator, with a distance between them,
b) the first bearing part contains soft-magnetic rotor disk elements which are aligned at right angles to the axis of the rotor shaft, are arranged one behind the other in the direction of the axis and are each separated, forming an intermediate space,
c) the second bearing part contains soft-magnetic stator disk elements, which are aligned at right angles to the rotor shaft axis, are arranged one behind the other in the direction of the rotor shaft axis, are at a distance from one another and each project into one of the intermediate spaces of adjacent rotor disk elements,
d) a magnetic flux directed essentially in the axial direction is formed between the elements.

A corresponding bearing device is disclosed, for example, in DE 38 44 563.

Magnetic bearing devices allow non-contacting and wear-free bearing of moving parts. They require no lubricants and can be designed to have low friction.

Known radial and axial magnetic bearing devices use magnetic forces between stationary electromagnets of a stator and ferromagnetic elements which rotate jointly of a rotor body. The magnetic forces are always attractive in the case of this bearing type. In principle, this means that it is impossible to achieve an inherently stable bearing in all three spatial directions. Magnetic bearing devices such as these therefore require active bearing regulation, controlling the currents of electromagnets by position sensors and control loops and counteracting discrepancies of the rotor body from its nominal position. The multichannel regulation to be carried out requires complex power electronics. Corresponding magnetic bearing devices are used for example, for turbomolecular pumps, ultra-centrifuges, high-speed spindles for machine tools and X-ray tubes with rotating anodes; they are also known to be used for motors, generators, turbines and compressors.

The basic design of a corresponding bearing device 30 is sketched in FIG. 1. The figure shows two active radial bearings 31 and 32 with excitation magnets 33 and 34 and bearing rotors 35 and 36 on a rotor shaft 37, an active axial bearing 38 with rotor disks 39 and 40 on the rotor shaft 37 and concentric windings 42*i* on the rotor disks, as well as five distance sensors 41*a* to 41*e* corresponding to the in each case two lateral degrees of freedom per radial bearing and the single degree of freedom of the axial bearing. Furthermore, five associated control loops r1 to r4 and z5 are required. Because the attraction forces increase as the bearing gap becomes smaller in a bearing device such as this, corresponding devices are non-stationary from the start. The position of the rotor shaft 37 must therefore be stabilized by the control loops, comprising distance measurement by the sensors 41*a* to 41*e* with a downstream regulator and downstream amplifier, which feeds the excitation magnets 33 and 34. Corresponding bearing devices are accordingly complex. In addition, a mechanical holding bearing must be provided as a precaution against sudden failure of the control loop.

Magnetic bearing devices with permanent magnets and high-$T_c$ superconductor material are also known, for example from DE 44 36 831 C2. Bearing devices such as these are intrinsically stable, that is to say they do not require regulation. However, because of the required cryogenic operating temperature for the superconductor material, in particular of below 80 K, thermal insulation and a refrigerant supply are required by an appropriate cryogenic coolant or by a refrigeration machine.

Bearing devices which are intrinsically stable in one direction with magnetic flux, soft-magnetic parts composed for example of iron and with permanent magnets are also known. In corresponding embodiments of bearing devices such as these, for example those which can be found in DE 34 08 047 A and DE 38 44 563 A, permanent-magnet rings on a shaft are aligned axially primarily with the poles of an iron yoke and thus provide radial centering. The magnetic flux is in this case amplified by excitation coils, with the axially unstable degree of freedom being stabilized, if necessary, by an electronic control loop. In this case, a plurality of stationary and rotating ring magnets which alternate axially one behind the other are arranged in a row with the same axial magnetization and carry out a radial bearing function. In this case as well, the axial degree of freedom must be actively stabilized.

DE 199 44 863 A also discloses a pump having a modified radial bearing. In this case, a rotor is provided with permanent-magnet cylinders instead of rings, with stationary permanent magnets or iron cylinders axially opposite one another on it. A stator which surrounds the rotor has electrical excitation coils. In addition, special radial stabilizers are provided.

All the bearing devices mentioned above and having permanent-magnet parts have relatively low supporting force and inadequate bearing stiffness, however.

SUMMARY OF THE INVENTION

One possible object is to specify a magnetic bearing device for a non-contacting bearing for a shaft, in particular for a high-speed machine such as a turbocompressor, which is less complex than the related art. One particular aim is to ensure a good supporting force and high bearing stiffness while taking account of dynamic forces and tight gap tolerances.

Accordingly, the inventor proposes a device for magnetic bearing of a rotor shaft with respect to a stator, the following features are intended to be provided, specifically
in that a first bearing part is connected to the rotor shaft and is surrounded by a second bearing part, which is associated with the stator, with a distance between them,
in that the first bearing part contains soft-magnetic rotor disk elements which are aligned at right angles to the axis of the rotor shaft, are arranged one behind the other in the direction of this axis and are each separated, forming an intermediate space,
in that the second bearing part contains soft-magnetic stator disk elements, which are aligned at right angles to the rotor shaft axis, are arranged one behind the other in the direction of this axis, are at a distance from one another and each project into one of the intermediate spaces of the rotor disk elements, in that the rotor disk elements and the stator disk elements are provided on their respectively mutually facing sides with annular tooth-like projections which are each opposite one another separated by an air gap, and in that magnetic-field-generators are associated with the rotor disk elements or the stator disk elements in order to generate a magnetic flux directed essentially in the axial direction between these elements.

In contrast to the related art, in the case of the bearing device proposed by the inventor the external magnetic-field-generators force a magnetic flux across the respective bearing gap and magnetize the tooth-like projections composed of the soft-magnetic material, such as in particular iron. In this case, the magnetic flux density in the respective gap is inhomogeneous, as a result of which forces are exerted on iron surfaces. In this case, considerably greater magnetization, and therefore a greater bearing force per unit area can advantageously be achieved in soft-magnetic material such as iron than by arrangements composed of permanent-magnet material such as neodymium-iron-boron (Nd—Fe—B) on its own.

Based on the reluctance principle, the system tries to minimize the magnetic reluctance and to align the tooth-like projections such that they are as closely opposite one another as possible. In the event of any radial deflection, the magnetic forces produce a proportional resetting force, which means that there is no longer any need for radial regulation.

The maximum radial force is applied on movement through half the width of a tooth-like projection. Since the length scale is governed by the radial width of the tooth-like projections and of the intermediate spaces adjacent to them, the bearing stiffness can be selected within wide limits by the dimensions of the tooth-like projections. In particular, very stiff bearings can be produced by using a fine tooth pitch. In the case of a symmetrical arrangement with identical bearing gaps on both sides, the axial forces on the rotor disk elements cancel one another out. However, this equilibrium is axially unstable and must be stabilized by additional means such as actively regulated magnetic bearings, and possibly also by mechanical bearings. However, only a single control loop is now required for a single axial bearing per shaft, instead of five as in the case of the related art as shown in FIG. 1 with actively regulated radial bearings.

On the other hand, a considerable magnetic steady-state axial force can be applied without any need for electrical power by a slight axial movement, so that the axial bearing has to absorb only the dynamic component of the axial load. This can be achieved by adjustment of axial regulation, by predetermining a minimum value of the temporal mean value of the magnetic flux of the axial bearing as a nominal value.

The bearing device can accordingly additionally have the following features:

In order to close the magnetic flux circuit, axially extending soft-magnetic material can be provided such as an axially running yoke body or at least parts of the rotor shaft, outside the intermediate spaces between the rotor disk elements and the stator disk elements on the radially inner or outer edge of the disk elements with which the magnetic-field-generators are not associated. Parts such as these composed of soft-magnetic material can be used to reduce the magnetic reluctance of the magnetic flux circuit, so that this makes it possible to achieve a corresponding increase in the flux density between the tooth-like projections and, in consequence, better magnetic stiffness.

The magnetic-field-generators may advantageously be permanent-magnet elements, in which case these elements can be integrated at least in some of the rotor disk elements and/or of the stator disk elements. Corresponding bearing devices are relatively compact to construct.

In this case, the disk elements which are provided with the permanent-magnet elements can advantageously each be subdivided axially into two halves, between which the permanent-magnet elements are then arranged.

It is also advantageous in order to achieve high flux densities between the disk elements and for effective utilization of the permanent-magnet material for the disk elements with the permanent-magnet elements to have a greater extent radially than the disk elements without permanent-magnet elements.

Instead of or in addition to using permanent-magnet elements, the magnetic-field-generators may be formed by at least one winding of an electromagnet. This winding may be arranged on the radially inner or outer edge of the rotor disk elements or stator disk elements, in which case it can be associated with axially running soft-magnetic material of a yoke body or of the rotor shaft. The winding is located outside the intermediate spaces formed between the rotor disk elements and the stator disk elements, on the edge of the elements with which the magnetic-field-generators are not associated, in order to close the magnetic flux circuit.

The mutually facing flat faces of the rotor disk elements and of the stator disk elements which are provided with the tooth-like projections are preferably arranged at an angle to a perpendicular to the rotor shaft axis. An inclination such as this results in wedge-shaped longitudinal section forms. The axial extent (disk thickness) and the inclination angle are in this case chosen such that the disk elements can absorb the magnetic flux everywhere, without becoming magnetically saturated.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
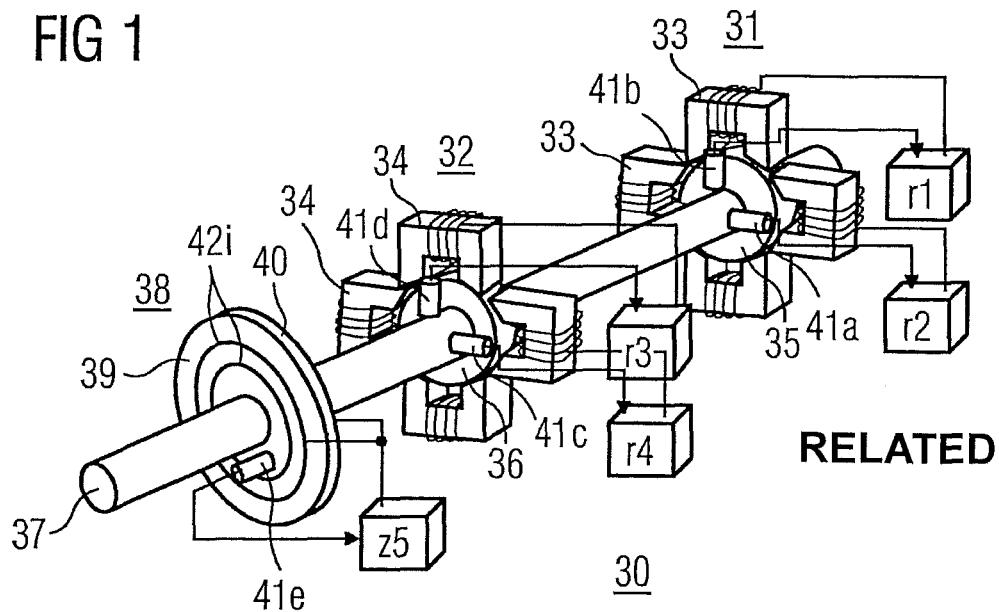
FIG. 1 shows a known magnetic bearing device.

Reference will now be made in detail to the preferred embodiments of the present invention, examples of which are illustrated in the accompanying drawings, wherein like reference numerals refer to like elements throughout.

Parts of magnetic bearing devices which are not shown in any more detail in the figures are generally known. The magnetic bearing device shown in FIG. 2 and annotated generally 2 comprises a rotor shaft 3, which is to be borne without contact, with a first bearing part 4 which has rotor disk elements 4i which also rotate, are attached to the rotor shaft 3, and are aligned at right angles to the axis A of the rotor shaft 3. These elements are composed of soft-magnetic material and are arranged at a distance from one another, one behind the other in the axial direction, in each case forming intermediate spaces 5j. A fixed-position stator forms a second bearing part 7, likewise with stator disk elements 7i, which are likewise at an axial distance from one another, are in the form of annular disks and surround the rotor shaft 3 at a distance from it. These elements are also composed of the soft-magnetic material and project without contact radially into the intermediate spaces 5j, thus resulting in an axially alternating, comb-like arrangement of rotor disk elements 4i and stator disk elements 7i. The rotor disk elements and stator disk elements are provided on their respectively mutually facing sides with respective tooth-like projections 4f and 7f, which are opposite one another separated by an air gap 8k with a small axial extent or width b, and/or are designed to form such projections. The projections of each disk element are annular and are arranged concentrically one under the other. In this case, the width b is advantageously between 0.05 and 0.25 times the radial distance s between the centers of adjacent projections. The figure also shows lines of force of a magnetic flux Mf, by dashed lines, produced by external magnetic-field-generators that are not shown.

At the stack ends, the end disk elements 7e are in the form of flux conducting pieces with grooves on one side which, together with a magnetic flux return path, for which by way of example a ferromagnetic shaft or a stationary iron yoke body may be provided, close the magnetic flux circuit.

Figure 2:
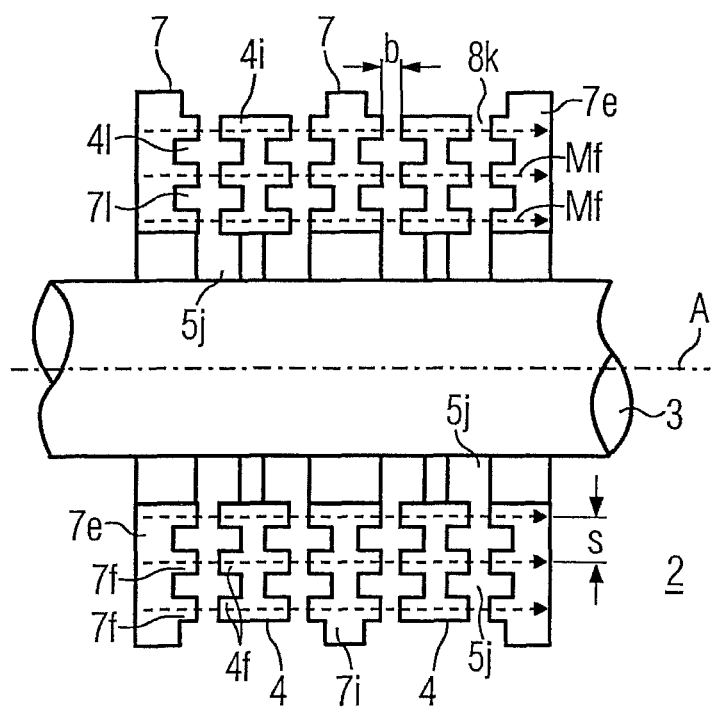
FIG. 2 shows the basic design of a proposed magnetic bearing device.

As is also illustrated in FIG. 2, the tooth-like projections 4f and 7f on the respective annular disk elements 4i and 7i may have a rectangular shape or cross section when seen in the form of a longitudinal section. In this case, the gaps 41 and 71 between the projections may be of approximately the same width, and be about half the depth to the depth itself (seen axially). The gaps and the tooth-like projections preferably have the same radial dimensions.

The elements 4i and 7i which are in the form of annular disks as well as all the other parts which carry magnetic flux in a magnetic bearing device may preferably be composed of soft-magnetic materials with high saturation magnetization, for example Fe, Fe alloyed with Si, or an FeCo alloy. The air gap 8k between opposite tooth-like projections 4f and 7f in this case has an axial width which is in general between 0.2 and 0.6 times the corresponding width of the tooth-like projections and of the gap depth adjacent thereto.

For radial bearings, the tooth-like projections 4i and 7i, for example on iron disks, are formed by surfaces with annular and concentric grooves on both sides. In the equilibrium position shown in FIG. 2, these projections 4i and 7i are precisely opposite one another; in the event of radial deflection, the magnetic forces produce a proportional restoring force. As is evident from the profile of the magnetic lines of force Mf in FIG. 3 on the basis of a detail from a plurality of the disk elements 4i and 7i in the embodiment shown in FIG. 2, the system with its parts which guide the magnetic flux attempts to minimize the magnetic reluctance, based on the reluctance principle, such that the tooth-like projections of adjacent disk elements are aligned such that they are as closely as possible opposite one another, as shown in FIG. 2.

Figure 3:
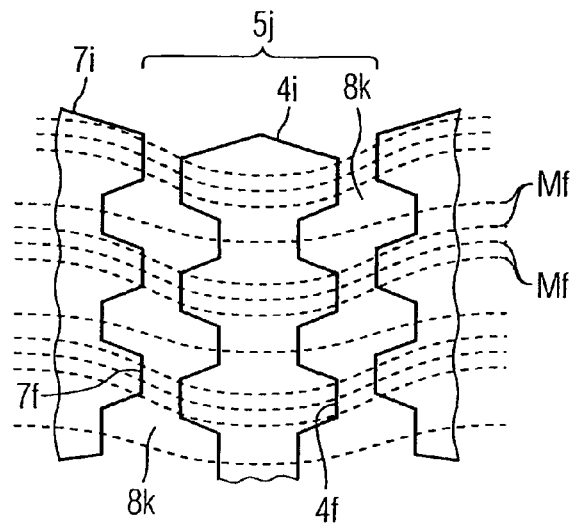
FIG. 3 shows the profile of the lines of force between tooth-like projections of rotor-disk and stator-disk elements when a rotor shaft is deflected radially.

As is also evident from FIG. 3, the tooth-like projections may advantageously be trapezoidal when seen in longitudinal section, with their sides being inclined at up to 45° with respect to a parallel to the rotor shaft axis A.

FIGS. 4 to 8 show various refinement options for magnetic bearing devices which each differ by their magnetic flux circuits with external units for generation of an axial magnetic flux by the disk elements, which are located one behind the other, of the first and second bearing parts. The lines of force of the magnetic flux Mf are in this case shown by dashed lines.

Figure 4:
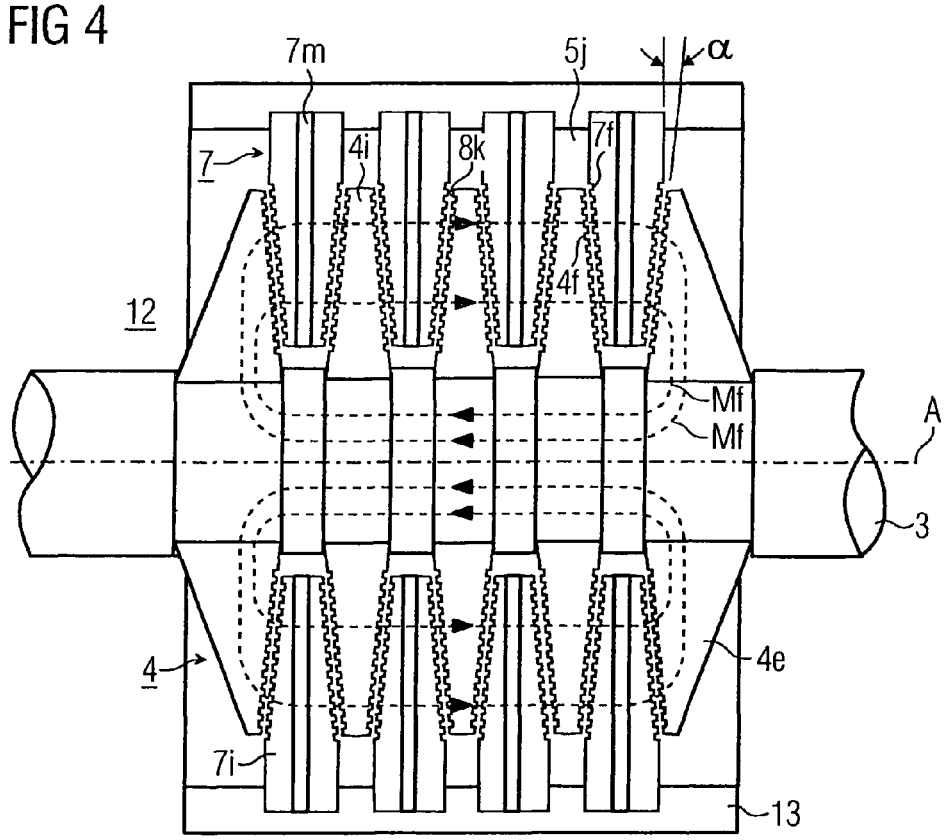
FIGS. 4 to 6 show specific embodiments of magnetic bearing devices with permanent magnets as the magnetic-field-generators.

In the case of the magnetic bearing device that is annotated 12 in general in FIG. 4, its stator elements 7i are each subdivided axially into two halves, between which a permanent-magnet element is located as a magnetic-field-generators. A radially extending layer or an annular disk 7m composed of the permanent-magnet material, preferably of Nd—Fe—B material, is accordingly inserted in the center of each stator disk element 7i. In this case, the stator disk elements advantageously have an axially larger diameter than their grooved active surface provided with the tooth-like projections 7f, in order in this way to make it possible to achieve flux densities in particular of 1 Tesla or more in the air gap 8k, and operate the magnetic material at an operating point, for example between 0.5 and 0.8 Tesla in the case of NbFeB, with a high energy product B*H. Furthermore, the mutually facing flat faces of the rotor disk elements 4i and stator disk elements 7i which are provided with the tooth-like projections 4f and 7f are advantageously arranged inclined. An inclination such as this makes it possible to match the iron thickness to the local magnetic flux. This allows the axial bearing length to be kept relatively short. The inclination angle α to the perpendicular to the rotor shaft axis A should in this case be chosen such that there are no magnetically saturated areas in the disk elements despite the resultant wedge shape of the disk elements (seen in longitudinal section). According to the exemplary embodiment, the angle α is between about 7° and 15°, for example about 10°. The jointly rotating end disk elements 4e of the first bearing part 4 and the rotor shaft 3 composed of iron or with iron parts form the magnetic flux return path. A non-magnetic sleeve 13 holds the fixed-position stator disk elements 7i together at their outer edge.

Figure 5:
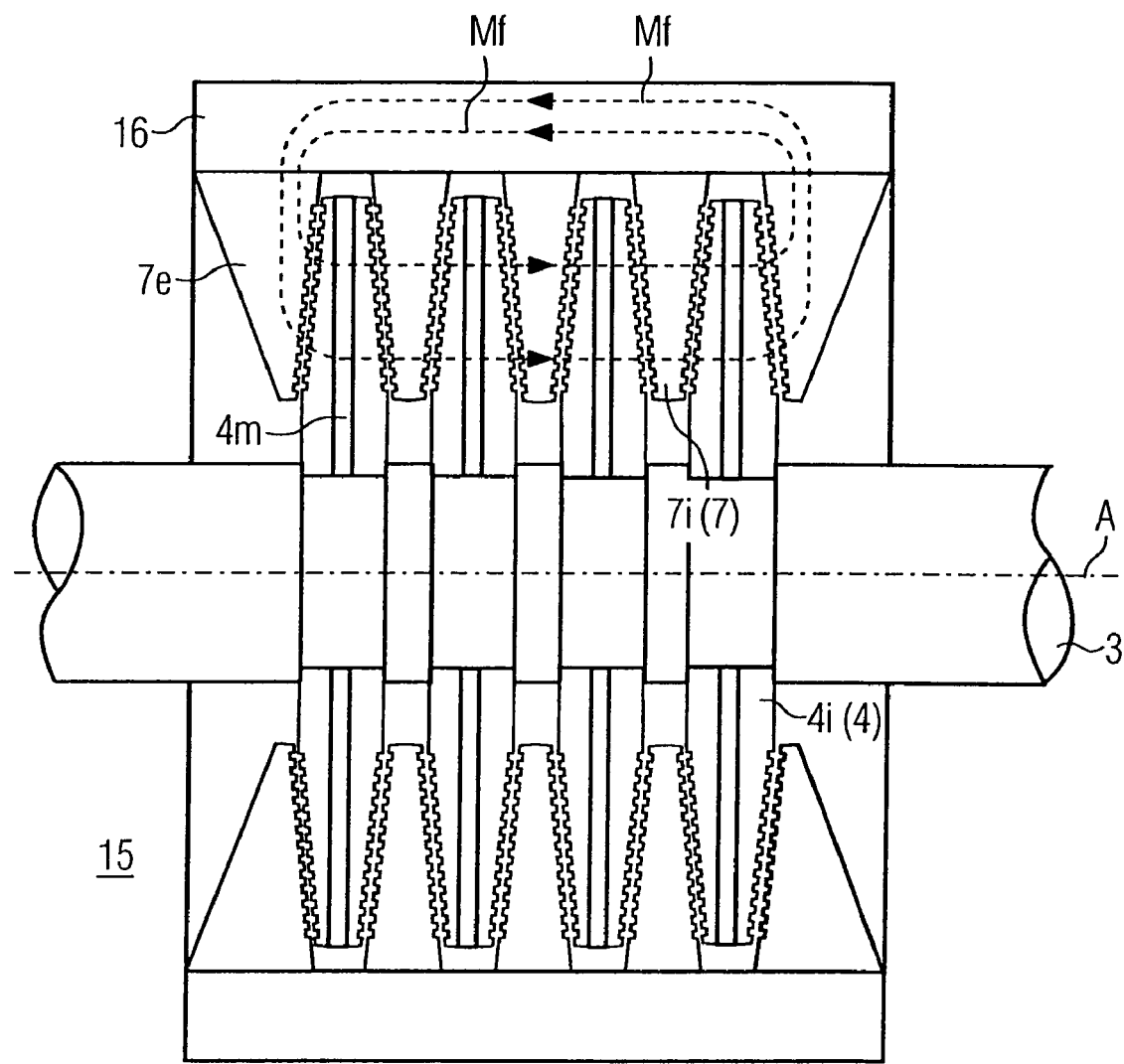

The magnetic bearing device that is shown in FIG. 5 and is annotated 15 in general differs from the device 12 shown in FIG. 4 only in that its rotor disk elements 4i, rather than its stator disk elements 7i, are provided with the permanent-magnet material in the form of layers or disks 4m, in each case at the axial disk center. In this embodiment, the rotor shaft 3 is non-magnetic; the magnetic return path is in this case formed by fixed-position end disk elements 7e and a stationary outer yoke body 16 of the second bearing part 7 at the outer edge of the stator disk elements 7i.

In the case of the magnetic bearing devices 12 and 22 shown in FIGS. 4 and 5, it is also possible to equip only individual ones of their annular disk elements 7i and 4i, for example every second, third or fourth element, with a correspondingly thicker NdFeB element 7m or 4m, respectively. In order to avoid a magnetic short, a non-magnetic intermediate space with a width of 10 to 50 times that of the bearing gap must then be inserted between the disk elements and the respective magnetic return path body, that is to say the shaft 3 in the case of FIG. 4 and an outer yoke body 9 in the case of FIG. 5, for magnetic isolation. In this case, only the end disk elements are closely magnetically linked.

Figure 6:
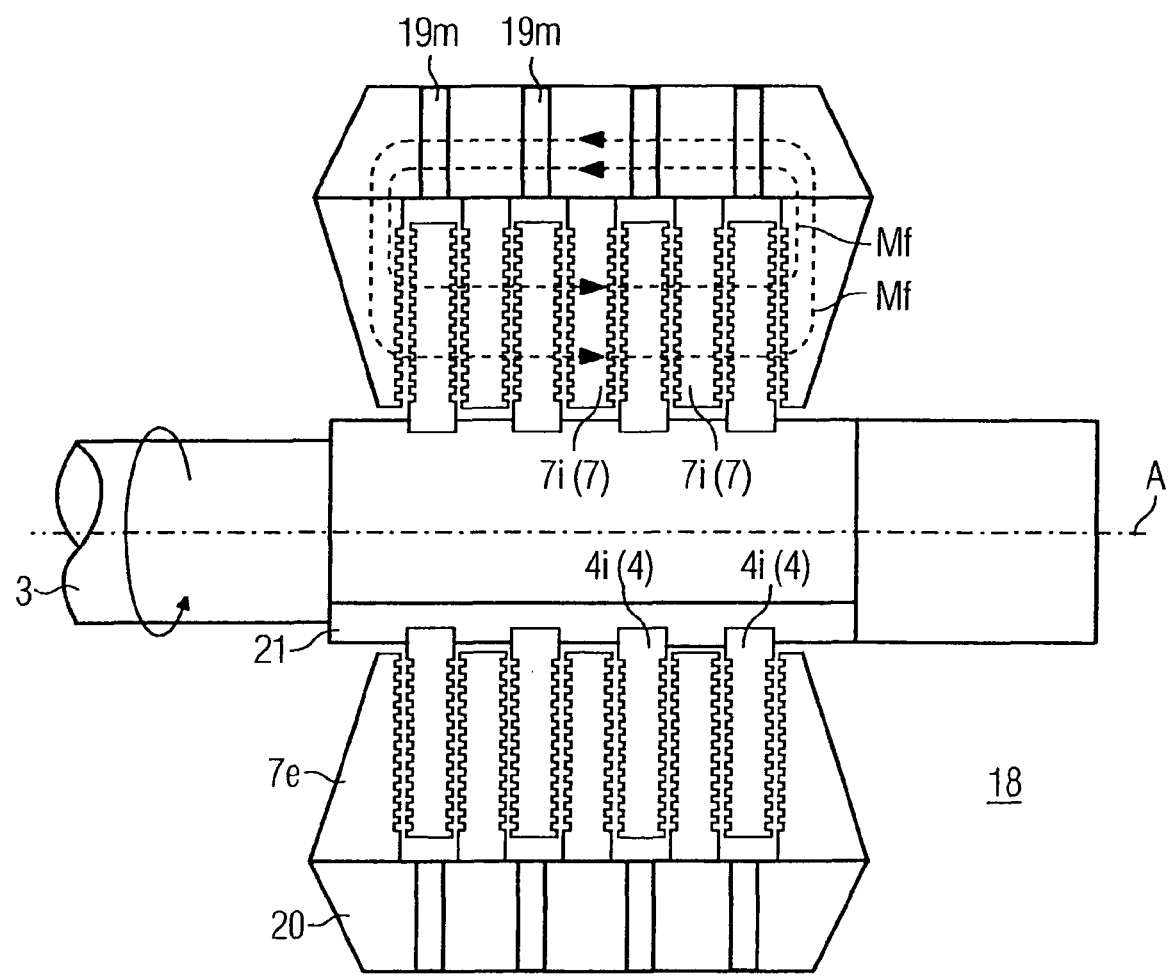

In the case of the magnetic bearing device which is annotated 18 in general and is shown in FIG. 6, one or more elements 19m in the form of annular disks are inserted into an outer yoke body 20, which carries magnetic flux and is composed of soft-magnetic material, radially aligned in the second bearing part 7 of this magnetic bearing device. Apart from the radial flux-carrying end disk elements 7e of a stator 7, the disk elements 7i and/or 4i may in this case be as thin as the mechanical load allows. When using a rotor shaft 3 composed of magnetic material, a magnetically isolating intermediate element 21 must also be provided in this case for the jointly rotating rotor disk elements 4i, for example in the form of a non-magnetic sleeve. However, in the illustrated embodiment, the shaft 3 should be as non-magnetic as possible.

Figure 7:
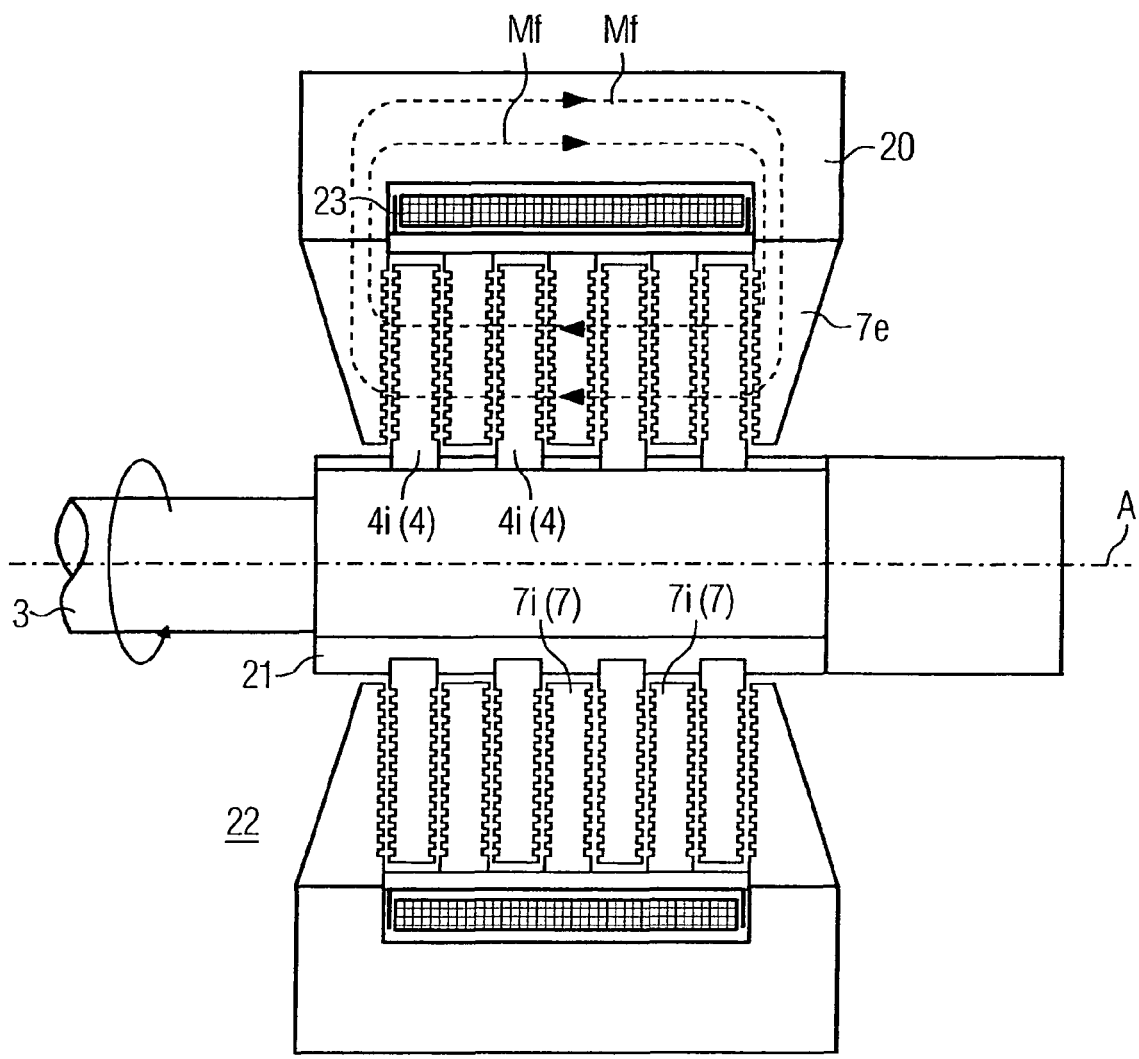
FIGS. 7 and 8 show specific embodiments of magnetic bearing devices each having at least one electromagnet winding as the magnetic-field-generators.
Figure 8:
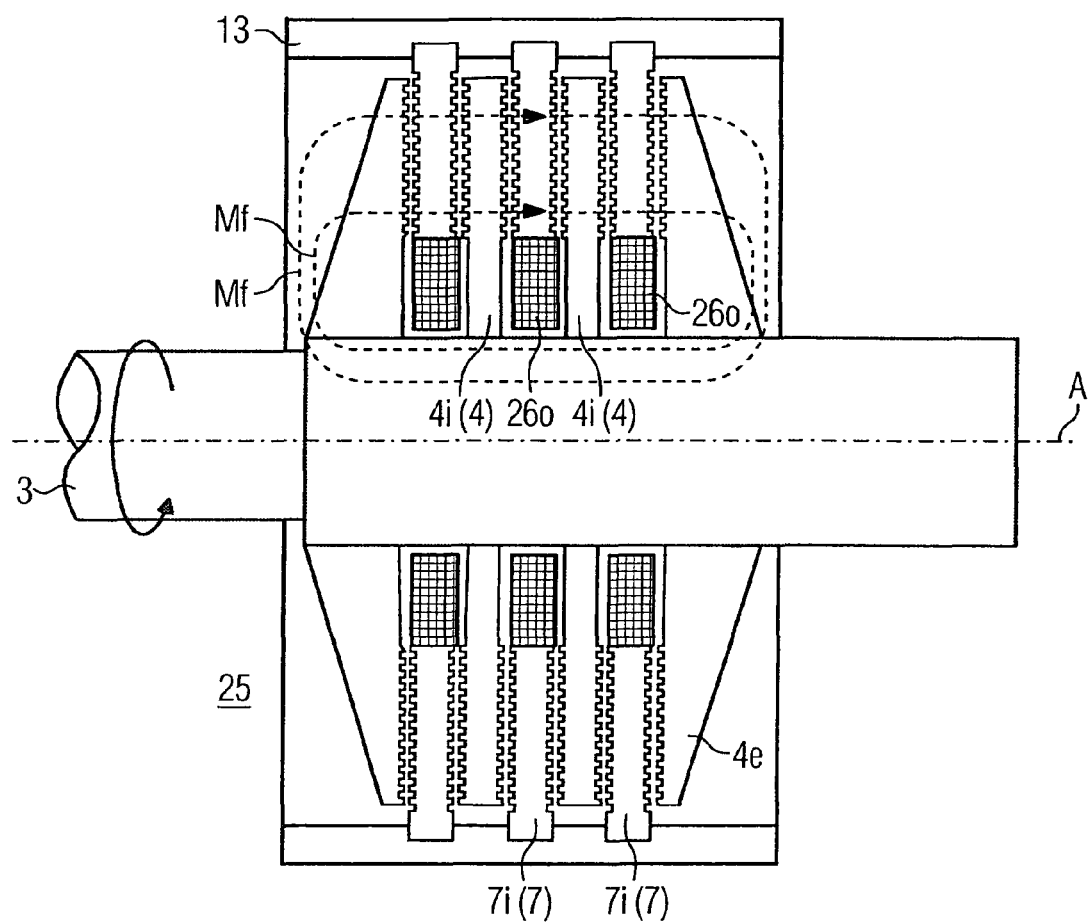

Instead of using permanent-magnet elements as the magnetic-field-generators, windings of electromagnets can be provided just as well. FIGS. 7 and 8 each show one possibility for a corresponding magnetic bearing device 22 or 25, respectively. The embodiment of the magnetic bearing device 22 shown in FIG. 7 differs from the magnetic bearing device 18 shown in FIG. 6 in consequence in that there are no permanent-magnet elements in its soft-magnetic outer yoke body 20 and, instead of this, at least one winding 23 of an electromagnet is fitted to it. The magnetic flux density B and thus the bearing stiffness, which is proportional to $B^2$, can advantageously be controlled by the current through the excitation winding 23. In this case as well, when using a rotor shaft 3 composed of magnetic material, a magnetically sufficiently isolating intermediate body 21 is required between the shaft and the individual rotor disk elements 4i. A corresponding embodiment is shown in the lower half of the figure, while the upper half is based on the assumption that the shaft is non-magnetic.

In the embodiment of the magnetic bearing device 25 shown in FIG. 8, the electromagnet windings 26o are located at the inner edge of fixed-position stator disk elements 7i. These elements are once again held together at their outer edge by a non-magnetic sleeve 13, as shown in FIG. 4. In this case, a rotor shaft 3 composed of magnetic material is used as the return path body for carrying the magnetic flux Mf. In this embodiment as well, the bearing stiffness can advantageously be adjusted by the windings 26o.

The embodiments of magnetic bearing devices 2, 12, 15, 18, 22 and 25 as explained above have been based on the assumption that the magnetic-field-generators are either permanent-magnet elements 4m, 7m, 19m or magnetic windings 23, 26o. A combination of the permanent-magnet elements and windings of electromagnets as illustrated in the individual figures is, of course, also possible in order to generate the desired axial magnetic flux Mf over the tooth-like projections 4m and 7m of the bearing devices.

In the embodiments of magnetic bearing devices illustrated in the figures, the rotor shaft axis A in each case extends in the horizontal direction. It is, of course, also possible for the magnetic bearing devices to be aligned such that their rotor shaft axis is in a direction at an angle to or perpendicular to this. In this case, the radial guidance is intrinsically stable for all of these bearing devices. The advantageous of a bearing such as this is that only the remaining axial degree of freedom need be stabilized by, for example, an actively regulated magnetic bearing. In this case, compared with bearing devices using permanent magnets according to the related art that has been explained, higher fields can be generated in the respective air gap and the structure of the tooth-like projections may be very fine, leading to high bearing stiffness. With permanent-magnet excitation, the radial guidance requires no power. Further, this can be used in aggressive environments. In the case of the embodiments which use electromagnet windings for excitation, a method which is known from conventional bearings can advantageously be used to pass through critical rotation speeds (see DE 42 34 524 A1), with a rotation-speed sensor being able to be used to identify the proximity to a critical value, allowing the current and the bearing stiffness to be briefly increased or reduced. This makes it possible to bypass mechanical resonances in the overall system. Furthermore, a continuous axial force can be applied, without any power consumption, by adjustment of the axial position of the individual rotating disk elements with unequal air gaps. The axial control loop now has to compensate only for the axial time-dependent forces, and ensure the axial stability.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A device for magnetic bearing of a rotor shaft with respect to a stator, the rotor shaft rotating about a rotation axis, the device comprising:

a first bearing part connected to the rotor shaft, the first bearing part containing soft-magnetic rotor disk elements aligned at right angles to the rotation axis, the rotor disk elements being arranged one behind the other in a direction of the rotation axis, the rotor disk elements being separated with respective intermediate spaces therebetween; and a second bearing part associated with the stator, the second bearing part substantially surrounding the first bearing part with a distance between the first and second bearing parts, the second bearing part containing soft-magnetic stator disk elements aligned at right angles to the rotation axis, the stator disk elements being arranged one behind the other in the direction of the rotation axis, each stator disk element projecting into one of the intermediate spaces between adjacent rotor disk elements such that the rotor disk elements and the stator disk elements have mutually facing sides separated from one another, wherein the rotor disk elements and the stator disk elements are provided on their respectively mutually facing sides with annular tooth-shaped projections having an axial width, the tooth-shaped projections on the stator disk element opposing the tooth-shaped projections on the adjacent rotor disk elements with an air gap therebetween, the mutually facing sides of the rotor disk elements and the stator disk elements, that are provided with the tooth-shaped projections, are inclined at an angle to a direction perpendicular to the rotation axis, a magnetic-field-generator is associated with the rotor disk elements or the stator disk elements to direct a magnetic flux between the disk elements in the direction of the rotation axis, and the air gap between opposing tooth-shaped projections has an axial width, the axial width being between 0.2-times and 0.6-times the axial width of the tooth-shaped projections.

2. The magnetic bearing device as claimed in claim 1, wherein in order to close a magnetic flux circuit, axially extending soft-magnetic material is provided outside the intermediate spaces, between the rotor disk elements and the stator disk elements on radially inner or outer edges of disk elements that are not associated with the magnetic-field-generator.

3. The magnetic bearing device as claimed in claim 2, wherein the soft-magnetic material for closing the magnetic flux circuit is provided through an axially running yoke body or through at least parts of the rotor shaft.

4. The magnetic bearing device as claimed in claim 1, wherein permanent-magnet elements are provided as the magnetic-field-generator.

5. The magnetic bearing device as claimed in claim 4, wherein
the permanent-magnet elements are integrated into at least in some of the rotor disk elements or stator disk elements,
the disk elements having permanent-magnet elements integrated therein are referred to as PM disk elements.

6. The magnetic bearing device as claimed in claim 5, wherein
the PM disk elements each have an axis substantially perpendicular to the rotation axis of the rotor shaft, and
the disk elements with the permanent-magnet elements are each subdivided axially into two halves, between which one of the permanent-magnet elements is provided.

7. The magnetic bearing device as claimed in claim 5, wherein
disk elements not having permanent-magnet elements integrated therein are referred to as non-PM disk elements, and
the PM disk elements have a greater radial length than the non-PM disk elements.

8. The magnetic bearing device as claimed in claim 1, wherein the magnetic-field-generator is formed by at least one magnet winding of an electromagnet.

9. The magnetic bearing device as claimed in claim 8, wherein the at least one magnet winding is arranged on radially inner edges of the rotor disk elements or on radially outer edges of the stator disk elements.

10. The magnetic bearing device as claimed in claim 8, wherein the at least one magnet winding is associated with axially running soft-magnetic material of a yoke body or of the rotor shaft.

11. The magnetic bearing device as claimed in claim 1, wherein the mutually facing sides of the rotor disk elements and of the stator disk elements are inclined at an angle of between 7° and 15° to the direction perpendicular to the rotation axis.

12. The magnetic bearing device as claimed in 1, wherein the tooth-shaped projections have a trapezoidal cross-sectional shape.

13. A device for magnetic bearing of a rotor shaft with respect to a stator, the rotor shaft rotating about a rotation axis, the device comprising:
a first bearing part connected to the rotor shaft, the first bearing part containing soft-magnetic rotor disk elements aligned at right angles to the rotation axis, the rotor disk elements being arranged one behind the other in a direction of the rotation axis, the rotor disk elements being separated with respective intermediate spaces therebetween; and
a second bearing part associated with the stator, the second bearing part substantially surrounding the first bearing part with a distance between the first and second bearing parts, the second bearing part containing soft-magnetic stator disk elements aligned at right angles to the rotation axis, the stator disk elements being arranged one behind the other in the direction of the rotation axis, each stator disk element projecting into one of the intermediate spaces between adjacent rotor disk elements such that the rotor disk elements and the stator disk elements have mutually facing sides separated from one another, wherein
the rotor disk elements and the stator disk elements are provided on their respectively mutually facing sides with annular tooth-shaped projections having an axial width, the tooth-shaped projections on the stator disk element opposing the tooth-shaped projections on the adjacent rotor disk elements with an air gap therebetween,
the tooth-shaped projections have a trapezoidal cross-sectional shape,
a magnetic-field-generator is associated with the rotor disk elements or the stator disk elements to direct a magnetic flux between the disk elements in the direction of the rotation axis, and
the air gap between opposing tooth-shaped projections has an axial width, the axial width being between 0.2-times and 0.6-times the axial width of the tooth-shaped projections.

14. The magnetic bearing device as claimed in claim 13, wherein in order to close a magnetic flux circuit, axially extending soft-magnetic material is provided outside the intermediate spaces, between the rotor disk elements and the stator disk elements on radially inner or outer edges of disk elements that are not associated with the magnetic-field-generator.

15. The magnetic bearing device as claimed in claim 14, wherein the soft-magnetic material for closing the magnetic flux circuit is provided through an axially running yoke body or through at least parts of the rotor shaft.

16. The magnetic bearing device as claimed in claim 13, wherein permanent-magnet elements are provided as the magnetic-field-generator.

17. The magnetic bearing device as claimed in claim 16, wherein
the permanent-magnet elements are integrated into at least in some of the rotor disk elements or stator disk elements,
the disk elements having permanent-magnet elements integrated therein are referred to as PM disk elements.

18. The magnetic bearing device as claimed in claim 17, wherein
the PM disk elements each have an axis substantially perpendicular to the rotation axis of the rotor shaft, and
the disk elements with the permanent-magnet elements are each subdivided axially into two halves, between which one of the permanent-magnet elements is provided.

19. The magnetic bearing device as claimed in claim 17, wherein
disk elements not having permanent-magnet elements integrated therein are referred to as non-PM disk elements, and
the PM disk elements have a greater radial length than the non-PM disk elements.

20. The magnetic bearing device as claimed in claim 13, wherein the magnetic-field-generator is formed by at least one magnet winding of an electromagnet.

21. The magnetic bearing device as claimed in claim 20, wherein the at least one magnet winding is arranged on radially inner edges of the rotor disk elements or on radially outer edges of the stator disk elements.

22. The magnetic bearing device as claimed in claim 20, wherein the at least one magnet winding is associated with axially running soft-magnetic material of a yoke body or of the rotor shaft.

* * * * *